United States Patent
Caffiau et al.

(10) Patent No.: US 11,407,186 B2
(45) Date of Patent: Aug. 9, 2022

(54) FIBER APPLICATION HEAD WITH FLEXIBLE ROLLER PROVIDED WITH AN ANTI-ADHERENT SHEATH

(71) Applicant: CORIOLIS GROUP, Quéven (FR)

(72) Inventors: Johann Caffiau, Hennebont (FR); Jean-Philippe Weber, Ploemeur (FR); Alexander Hamlyn, Ploemeur (FR)

(73) Assignee: Coriolis Group, Queven (FR)

( * ) Notice: Subject to any disclaimer, the term of this patent is extended or adjusted under 35 U.S.C. 154(b) by 260 days.

(21) Appl. No.: 16/763,582

(22) PCT Filed: Nov. 9, 2018

(86) PCT No.: PCT/FR2018/000245
§ 371 (c)(1),
(2) Date: May 13, 2020

(87) PCT Pub. No.: WO2019/092328
PCT Pub. Date: May 16, 2019

(65) Prior Publication Data
US 2020/0282667 A1    Sep. 10, 2020

(30) Foreign Application Priority Data

Nov. 13, 2017    (FR) ...................................... 1701172

(51) Int. Cl.
*B29C 70/00*   (2006.01)
*B32B 1/00*    (2006.01)
(Continued)

(52) U.S. Cl.
CPC .............. *B29C 70/384* (2013.01); *B32B 1/08* (2013.01); *B32B 7/022* (2019.01); *B32B 7/028* (2019.01);
(Continued)

(58) Field of Classification Search
CPC ......... B29C 70/00; B29C 70/30; B29C 70/38; B29C 70/384; B32B 1/00; B32B 1/08;
(Continued)

(56) References Cited

U.S. PATENT DOCUMENTS 8,191,596 B2 *   6/2012   Hamlyn .................. B30B 3/005
                                                  156/441
2008/0093026 A1 *  4/2008  Naumann ............. B29C 70/386
                                                  156/580

FOREIGN PATENT DOCUMENTS

FR    3009510 A1    2/2005
FR    2 948 058 A1   1/2011
(Continued)

OTHER PUBLICATIONS

International Search Report for PCT/FR2018/000245, dated Feb. 1, 2019, 4 pages.
(Continued)

*Primary Examiner* — Abbas Rashid
*Assistant Examiner* — Matthew Hoover
(74) *Attorney, Agent, or Firm* — Patterson Thuente Pedersen, P.A.

(57) ABSTRACT

A fiber application head for producing composite material parts, comprising a compacting system comprising a compacting roller comprising a rigid central tube and at least one cylindrical part made of a flexible material and assembled on said central tube, and an anti-adherent sheath covering the cylindrical part, and a heating system that is able to emit thermal radiation in the direction of the (s). The anti-adherent sheath has lateral portions extending beyond the cylindrical surface of the cylindrical part in the direction of the rotation axis of the roller, the assembly of the anti-adherent sheath to said cylindrical part being carried out by the lateral portions.

11 Claims, 4 Drawing Sheets

(51) Int. Cl.
  *B32B 7/00* (2019.01)
  *B32B 25/00* (2006.01)
  *B29C 70/38* (2006.01)
  *B32B 7/022* (2019.01)
  *B32B 7/028* (2019.01)
  *B32B 1/08* (2006.01)
  *B32B 7/04* (2019.01)
  *B32B 25/08* (2006.01)
  *B29K 105/08* (2006.01)

(52) U.S. Cl.
  CPC ............... *B32B 7/04* (2013.01); *B32B 25/08* (2013.01); *B29K 2105/08* (2013.01); *B32B 2260/023* (2013.01); *B32B 2260/046* (2013.01); *B32B 2307/736* (2013.01)

(58) Field of Classification Search
  CPC .. B32B 7/00; B32B 7/02; B32B 7/022; B32B 7/028; B32B 7/04; B32B 25/00; B32B 25/08
  See application file for complete search history.

(56) References Cited

FOREIGN PATENT DOCUMENTS

FR        3 009 512 A1    2/2015
WO    WO 2006/092514 A2   9/2006
WO    WO 2017/089659 A1   6/2017

OTHER PUBLICATIONS

English translation of International Search Report for PCT/FR2018/000245, dated Feb. 1, 2019, 2 pages.
Written Opinion of the ISA for PCT/FR2018/000245, dated Feb. 1, 2019, 5 pages.
English translation of Written Opinion of the ISA for PCT/FR2018/000245, dated Feb. 1, 2019, 4 pages.
IPRP for PCT/FR2018/000245, dated May 19, 2019, 6 pages.
English translation of IPRP for PCT/FR2018/000245, dated May 19, 2019, 5 pages.

* cited by examiner

FIBER APPLICATION HEAD WITH FLEXIBLE ROLLER PROVIDED WITH AN ANTI-ADHERENT SHEATH

RELATED CASES

The present application is a National Phase entry of PCT Application No. PCT/FR2018/000245, filed Nov. 9, 2018, which claims priority from FR Patent Application No. 1701172, filed Nov. 13, 2017, which applications are hereby incorporated by reference in their entireties.

TECHNICAL FIELD

The present invention relates to a fiber application head for a fiber application machine for producing composite material parts, and more particularly to a so-called fiber placement head equipped with a particular application roller. The present invention also relates to a method for manufacturing parts made of composite material by means of a corresponding application head.

BACKGROUND

There are known fiber application machines, commonly called fiber placement machines, for the application by contact onto a layup tool, such as a male or female mold, of a wide band formed of several continuous flat fibers, of ribbon type, dry or impregnated with thermosetting or thermoplastic resin, in particular carbon fibers consisting of a multitude of carbon threads or filaments.

These machines are used to produce preforms formed of several superposed plies, each ply being formed by laying up onto the mold of one or more bands side by side. In the case of a layup of fibers pre-impregnated with thermoplastic or thermosetting resin, typically of a quantity of at least 40% in weight, the pre-impregnated preform obtained after laying up is hardened or polymerized by passing it through an oven to obtain a composite material part. In the case of so-called dry fibers, which are not pre-impregnated with resins, the fibers comprise a reduced quantity of so-called bonding resin, also called a binder, generally a thermoplastic resin, in a quantity of less than or equal to 5% in weight, to give a tackiness to the fibers during the layup. After layup, the so-called dry preform is subjected to a resin injection or infusion operation before the curing step.

These machines, such as described in the patent document WO2006/092514, typically comprise a fiber application head, a system for moving said head, fiber storage means, and fiber conveying means for conveying the fibers from said storage means to the head. The head typically comprises an application roller, also called a compacting roller, intended to come into contact with the mold for applying the band, and means for guiding the fibers on said application roller.

The head generally further comprises a heating system for heating the fibers. The compacting roller presses the band of fibers against the application surface of the mold, or against the band(s) of fibers previously applied, in order to facilitate the adhesion of the applied bands to each other, as well as to progressively discharge the air trapped between the laid bands. The heating system ensures the heating of the bands of fibers to be applied, and/or of the mold or bands already applied upstream of the compacting roller, just before the compacting of the band, in order to at least soften the pre-impregnation resin or bonding resin, and thus promote adhesion of the bands to one another.

In the case of thermosetting resins, the pre-impregnated fibers are simply heated to soften them, typically at temperatures of about 40° C. The heating system typically comprises an infrared heating system comprising one or more infrared lamps.

In the case of thermoplastic resins, the fibers pre-impregnated or having a binder must be heated at higher temperatures, at least up to the resin melting temperature, being of about 200° C. for nylon type resins, and up to about 400° C. for PEEK type resins.

To achieve these higher temperatures, hot air torch systems have been proposed, and more recently laser type heating systems to achieve accurate and concentrated heating. Due to the higher heating temperatures, the fiber placement heads are typically equipped with metallic compacting rollers, resistant to heat, which can furthermore be cooled by the interior via a water circuit. To be able to adapt itself to the profile of the application surface, segmented metallic compacting rollers have been proposed, comprising several roller segments independently mounted side by side on a same axle, each segment being radially moveable and in an independent manner, and being elastically biased against the application surface. These segmented metallic rollers have proven however to be complex in structure and implementation.

Flexible rollers formed from a so-called high temperature elastomer, including a thermal stabilizer, are also used. These rollers generally comprise an anti-adherent sheath heat-shrunk and glued to the cylinder made of elastomeric material, as described in patent documents FR 2948058 and FR 3009512. To cool them, it has been proposed to equip the placement heads with a cooling system capable of delivering an air flow to cool the roller from the outside or from the inside, as described in the patent document FR 2948058. Despite these cooling systems, flexible rollers can have a tendency to deteriorate when using thermoplastic resins. Depending on the heating temperatures used, the anti-adherent sheath may tend to degrade quickly. Laser heating can tend to deteriorate the glue used for gluing the sheath and lead to a disassembling of the sheath and the cylinder of flexible material. Furthermore, the deteriorated adhesive layer absorbs laser radiation and can rise to high temperatures which can deteriorate the sheath.

During layup, combustion of the impregnation resin of the fibers may occur. The combustion fumes tend to form deposits on the sheath. In addition to the problem of fouling the sheath, these deposits absorb laser radiation and can lead to the destruction of the sheath.

In document FR 3009510, it has been proposed to provide blowing nozzles to diffuse an inert gas previously heated, such as nitrogen, to locally form a protective atmosphere and to avoid oxidation of the resins. This diffusion of nitrogen represents a significant cost. Furthermore, this diffusion of nitrogen does not allow the presence of an operator in the layup cell during layup, and requires a renewal of the air in the cell before access is allowed.

The aim of the present invention is to propose a solution to overcome at least one of the aforementioned drawbacks, which in particular enables the use of a wide variety of resins, both thermosetting and thermoplastic, with a substantially uniform compaction of the applied band, and which is simple in design and construction.

To this end, embodiments of the present invention provide a fiber application head for producing composite material parts, comprising a compacting system comprising a compacting roller, also called an application roller, for applying one or more fibers, in particular a band formed of one or more flat fibers, onto an application surface, the compacting roller comprising a rigid central tube by which the roller is rotationally mounted on a support structure of the head and at least one cylindrical part made of a flexible material, elastically deformable, assembled coaxially, directly or indirectly, on the central tube, and an anti-adherent sheath covering the cylindrical part, and a heating system capable of emitting theral radiation in the direction of the fiber or fibers in the direction of the band, preferably just before the application by the application roller, characterized in that the anti-adherent sheath has lateral portions extending beyond the cylindrical surface of the cylindrical part in the direction of the rotation axis of the roller, the assembly of the anti-adherent sheath to the cylindrical part being carried out by the lateral portions, said lateral portions effecting a translational and rotational blocking of the sheath in relation to the cylindrical part.

According to an embodiment of the invention, the protective sheath is assembled by lateral portions outside the heating zone. This assembly allows to avoid a gluing of the sheath in the heating zone and therefore to avoid any risk of deterioration of the sheath due to a deterioration of the glue due to the radiation.

The use of a roller provided with such a sheath according to an embodiment of the invention makes it possible to obtain a flexible thermally stable compacting roller usable for the application of fibers at high temperatures, in particular above 400° C., in particular for the application of fibers impregnated with thermoplastic resins. The head according to an embodiment of the invention, which comprises a compacting roller of simple design, offers the possibility of using a wide variety of thermosetting or thermoplastic resins combined with a wide variety of fibers, synthetic or natural, hybrid or not, in particular fibers commonly used in the field of composites, such as glass fibers, carbon, quartz, and aramid fibers.

According to one embodiment, the compacting roller comprises a cylindrical part made of an elastomeric material, preferably unexpanded, for example a silicone or a polyurethane, preferably made of silicone, preferably having a hardness of between 25 Shore A and 80 Shore A, preferably at least 40 Shore A, in order to guarantee a good resistance of the sheath over time.

According to one embodiment, the compacting roller comprises a cylindrical part of foam, for example an expanded elastomer such as a polyurethane foam, preferably having a density between 200 kg/m$^3$ and 500 kg/m$^3$.

The anti-adherent sheath is advantageously formed from a fluoropolymer, preferably a fluoropolymer chosen from the group consisting of a polytetrafluoroethylene (PTFE), a perfluoroalkoxy (PFA), a fluorinated ethylene propylene (FEP), an ethylene tetrafluoroethylene (ETFE), preferably a PFA or FEP, and a fluoroelastomer, for example an FPM, FFPM or FEPM or a polyimide.

According to one embodiment, the anti-adherent sheath is thermoformed on the cylindrical part, preferably heat-shrunk, the thermoformed lateral portions ensuring at least partially the blocking of the sheath in rotation and in translation. The use of a heat-shrinkable sheath enables a simple and rapid assembly of the sheath starting from a sheath in the form of a tube which is subsequently heat-shrunk on the cylindrical part.

According to one embodiment, the central tube is provided with radial holes, the cylindrical part of flexible material having fluid communication means capable of putting the radial holes in fluid communication with the external cylindrical surface of the cylindrical part, the head comprising thermal regulation means capable of injecting a thermal regulation gas flow, advantageously a gas at room temperature or cooled, particularly air, in the internal passage of the central tube, the roller comprising an draining the cylindrical part, the intermediate layer ensuring intermediate layer interposed between the anti-adherent sheath and the evacuation of the thermal regulation fluid by the lateral faces of the roller. The use of such a draining layer combined with aby-inside cooling system makes it possible to effectively maintain the sheath and the cylindrical part at reasonable temperatures, below the deterioration temperatures of the materials used.

The intermediate layer is preferably formed from glass fibers, carbon fibers, metallic fibers or threads, for example copper or stainless steel, or polymer fibers, preferably thermoplastic fibers, for example PAN or PEEK fibers, the layer may be in the form of a non-woven fiber felt and/or in the form of a fabric. The thickness and the grammage of the intermediate layer are defined so as to ensure a passage of the gas flow sufficient to remove the calories. In the case of glass fibers, the intermediate layer forms an insulating barrier, limiting the rise in temperature by conduction of the cylindrical part made of flexible material. In the case of metallic fibers, the intermediate layer forms a barrier to the radiation emitted by the heating system.

Preferably, the fluid communication means comprises radial channels, each radial channel opening onto a radial hole in the central tube and onto the external cylindrical surface of the cylindrical part. The radial holes are distributed over the cylindrical wall of the central tube. The central tube has for example several sets of holes offset longitudinally along the axis of the compacting roller, each set comprising a plurality of holes made at regular angular intervals.

According to one embodiment, the head further comprises thermal regulation means capable of delivering a flow of thermal regulation fluid, in particular air, in the direction of the compacting roller, in order to cool the compacting roller from the exterior.

According to one embodiment, the intermediate layer comprises glass fibers preferably in the form of a fabric, for example in the form of a sleeve or braid.

According to one embodiment, the intermediate layer has end portions extending beyond the cylindrical surface of the cylindrical part, so as to guarantee the evacuation of injected gas.

According to one embodiment, each lateral portion of the sheath is assembled by its annular end section to the mechanical assembly means.

According to one embodiment, each lateral portion of the intermediate layer is assembled by its annular end section to the mechanical assembly means. Mechanical means can be used alone or in combination with thermoforming of the sheath, to assemble the sheath and/or the draining intermediate layer. According to one embodiment, the sheath is thermoformed and only the intermediate layer is assembled via mechanical means. Separate mechanical means can be used for the sheath and for the intermediate layer.

According to another embodiment, the intermediate layer is glued to the cylindrical part, on the cylindrical surface and/or on the lateral faces.

According to one embodiment, the mechanical means comprises two washers, assembled to each other by assembly means, such as screws, and between which the end section of the sheath and/or of the layer intermediate is enclosed.

According to one embodiment, the roller has at each end a portion defining a curved or inclined surface arranged in the extension of the cylindrical surface, in order to obtain a progressive folding of the sheath, this portion being formed of a part added to the cylindrical part or being integral with the cylindrical portion of the cylindrical part.

According to one embodiment, the head constitutes a fiber placement head comprising cutting means and feeding means, and possibly fiber blocking means. According to one embodiment, the head is used to perform a filament winding type application.

According to one embodiment, the head further comprises a blowing system comprising an air blowing nozzle connected to an air supply system, the nozzle being positioned upstream of the roller relative to the movement direction, and is capable of forming an air knife, preferably parallel to the axis of the roller, in the direction of the nip point between the compacting roller and the layup surface.

The head comprises a blowing nozzle delivering an air knife in the direction of the nip zone, also called the contact zone, so as to limit or even eliminate any deposit of combustion fumes on the external surface of the roller. The air knife enables the combustion flames to be extinguished by being blown out, or even to eliminate the emergence of any combustion flames by blowing them out. It is possible to blow out the flames with an air knife while guaranteeing, despite the high air flow rate, a satisfactory fiber layup quality, and efficient heating of the laid fiber(s), in particular with a laser type heating system, without the need to heat the air beforehand to form the air knife. This assembly of the sheath combined with the blowing nozzle guarantees a good stability of the sheath.

According to one embodiment, the blowing nozzle comprises a longitudinal discharge slot arranged parallel to the axis of the roller, or a plurality of outlets arranged along a line parallel to the axis of the roller. This parallel arrangement makes it possible to ensure an air knife at a high flow rate, sufficient to blow out the flames, without altering the fiber layup quality, in particular without displacing the fibers at the end of the trajectory.

According to embodiments,
- the blowing system is capable of forming an air knife having a length at least equal to half the length of the roller, preferably close to the length of the fiber or the bands of fibers laid by the head, the air knife preferably being centered relative to the roller;
- the blowing system is capable of delivering an air knife at a flow rate of at least 300 Nl/min, preferably at least 500 Nl/min, more preferably at least 600 Nl/min, for example about 700 Nl/min;
- the blowing system is capable of delivering an air knife at a flow rate of at least 50 Nl/min per centimeter of air knife lengthwise, preferably at least 100 Nl/min, more preferably at least 120 Nl/min; and/or
- the air blowing nozzle is connected to a supply source formed by a compressed air source or to a turbine, preferably mounted on the head, delivering pulsed air.

According to one embodiment, the head comprises a laser type heating system, in particular laser diodes, a YAG laser or a fiber laser, capable of emitting a laser beam in the direction of the contact zone between the roller and a layup surface. Alternatively, the heating system may include one or more infrared lamps.

The present invention also relates to a method for manufacturing a composite material part comprising the application of continuous fibers onto an application surface, characterized in that the application of fibers is carried out by means of a fiber application head as described previously, by relative displacement of the application head in relation to the layup surface along layup trajectories, the fiber being compacted during their application by means of said application roller.

The fibers conventionally used are continuous flat fibers, also called tows, generally unidirectional, and comprising a multitude of filaments. The laid fibers can be dry fibers or fibers pre-impregnated with thermosetting or thermoplastic resin. The fibers typically have widths of ⅛, ¼ or ½ inch. As used herein, the term "fibers" also refers to fibers of greater width, greater than ½ inch, conventionally called band in placement technology.

The method according to the invention is particularly advantageous in the case of the production of dry preforms produced from dry fiber provided with a binder and/or thermoplastic preforms produced from fibers pre-impregnated with thermoplastic resin, requiring high heating temperatures during layup to at least reach the melting point of the binder and/or the thermoplastic resins.

In the case of a dry preform, the method further comprises a step of impregnating resin into the dry preform, by adding one or more impregnating resins by infusion or injection to the dry preform, and a curing step to obtain a composite material part. In the case of a thermoplastic preform, the preform may possibly be subjected to an additional consolidation step to obtain a final composite material part. In situ consolidation can also be obtained during the application of the fibers.

The application of fibers can be carried out on the application surface of a tool to form a preform, such as described previously, by fiber placement, band placement, and/or winding. According to another embodiment, the application of fibers is carried out directly on the application surface of a prefabricated part, to reinforce this part with unidirectional fiber reinforcements, the prefabricated part being for example a part obtained by injection, molding or additive manufacturing, from one or more thermoplastic and/or thermosetting resins.

BRIEF DESCRIPTION OF THE DRAWINGS

The invention will be better understood, and other objectives, details, characteristics and advantages will appear more clearly in the following detailed explanatory description of a currently preferred embodiment of the invention, with reference to the schematic drawings annexed thereto, in which.

DETAILED DESCRIPTION

Figure 1:
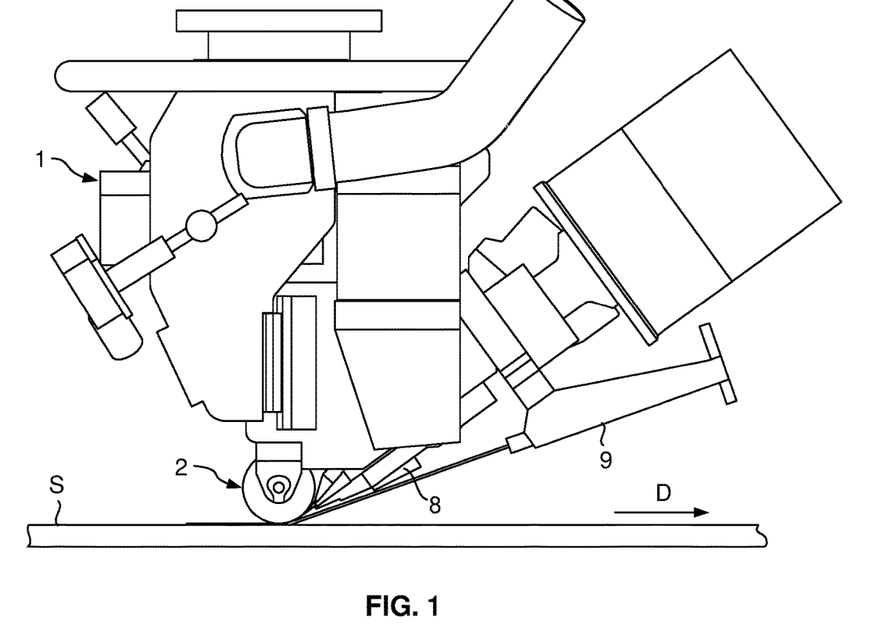
FIG. 1 is a schematic side view of a fiber application head according to the invention, illustrating the compacting roller, the heating system and the blowing system.
Figure 2:
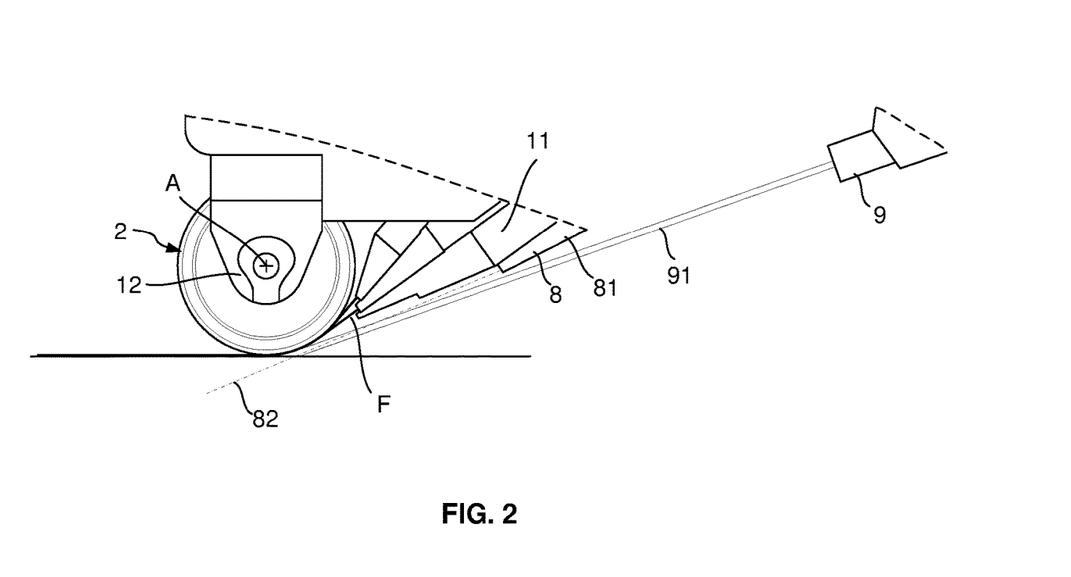
FIG. 2 is an enlarged partial view of FIG. 1.

With reference to FIGS. 1 and 2, the application head 1 comprises a compacting roller 2 which is mounted to rotate around an axis A on a support structure of the head. The head is intended for the application of a band formed of several fibers arranged side by side. The head is mounted by the support structure at the end of a movement system, for example a robot wrist joint. The head further comprises a heating system 9 also mounted on the support structure, upstream of the roller relative to the advancement direction D of the application head during the application of a band of fibers F onto an application surface. S. The heating device is for example a laser type heating system, the radiation of which is directed towards the band, just before its compaction, as well as towards the band(s) already laid.

As illustrated in FIG. 1, the radiation 91 is thus directed obliquely towards the nip zone or contact zone between the application roller and the application surface, to heat a section of the band located on the roller, before its compaction by the latter, as well as the application surface and/or one or more bands previously applied.

In the case of a fiber placement machine, the head comprises guiding means 11 which guide the fibers entering the head towards the compacting roller 2 in the form of a band of fibers, the fibers of the band being arranged side by side in a substantially contiguous manner. By movement of the head by the robot, the compacting roller is brought into contact with the application surface of a mold S to apply the band.

The fibers are preferably flat continuous fibers, of the tows type, pre-impregnated with a thermosetting resin or a thermoplastic resin, or dry fibers provided with a binder. The binder is in the form of powder and/or one or more veils, preferably of the thermoplastic type.

According to an embodiment of the invention, the head further comprises a blowing system 8, comprising a nozzle 81 also mounted on the support structure, upstream of the roller relative to the advancement direction D, capable of emitting a knife blade of compressed air towards the contact zone. The nozzle forms an air knife, parallel to the axis of the roller centred along a direction illustrated schematically under the reference 82. The nozzle is for example connected to a compressed air supply circuit.

Figure 3:
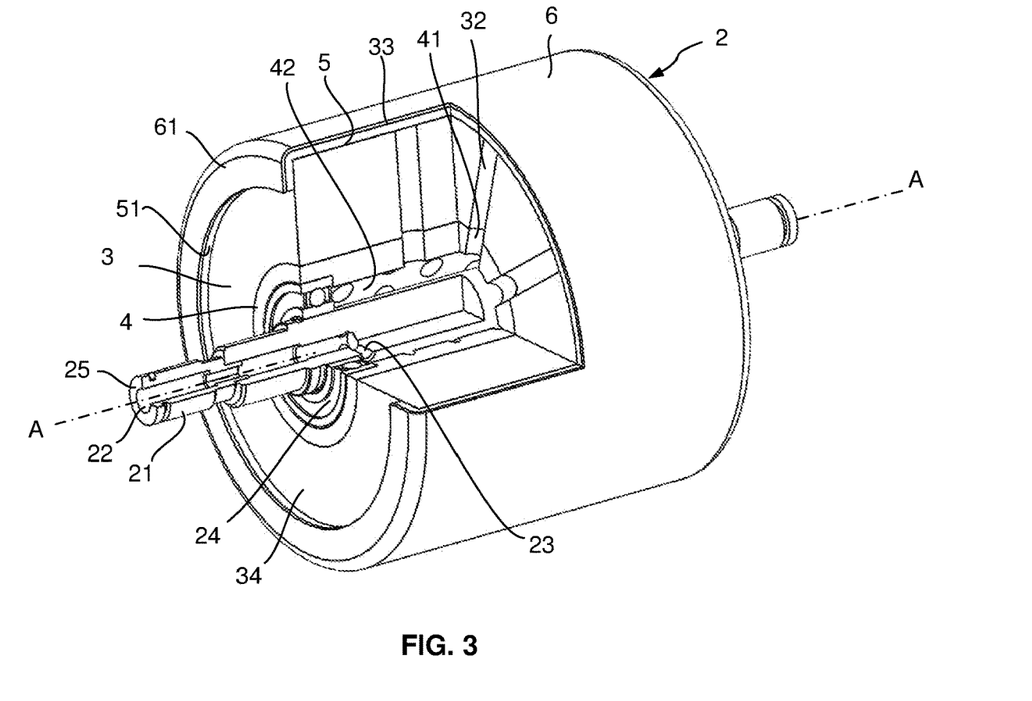
FIG. 3 is a schematic perspective view, with a partial cut away, of the compacting roller of FIG. 1.

With reference to FIG. 3, the compacting roller 2 comprises a cylindrical part or body 3 made of a flexible material, elastically deformable by compression. The cylindrical part has a cylindrical central passage for its assembly on a support core formed by a rigid cylindrical central tube 4, for example metallic, such as aluminium. The cylindrical part 3 and the central tube 4 are coaxial and are integral in rotation with one another. The cylindrical part here comprises a single cylindrical part with a cylindrical surface 33 and two lateral faces 34.

The cylindrical part 3 of flexible material gives the compacting roller a crushing capacity which enables the compacting roller to adapt itself to variations in the curvature of the application surface and thus to apply a substantially uniform pressure over the entire laid band. The rigid tube enables the rotary mounting of the roller on the support structure. The cylindrical part is for example comprised of an unexpanded elastomer, such as a silicone or polysiloxane, or a polyurethane, preferably a silicone, for example a two-component silicone which can be polymerized at room temperature. The cylindrical part has a hardness between 30 Shore A and 70 Shore A, for example 40, 50 or 60 Shore A, which will be chosen according to the desired crushing rate of the roller for a given compaction force, this crushing rate being defined in particular according to the complexity of the application surface.

The central tube is provided with radial holes 41, for example cylindrical, traversing the cylindrical wall of the central tube from end to end. The radial holes thus open onto the internal passage 42 of the central tube and onto the cylindrical part. The latter is provided with radial channels 32, aligned with said radial holes 41, having diameters substantially identical to those of the radial holes. Each radial channel 32 opens onto the external cylindrical surface 33 of the cylindrical part 3. By way of example, the central tube comprises six sets of radial holes 41 offset longitudinally along axis A of the roller, each set comprises a plurality of radial holes arranged at regular angular intervals, for example eight radial holes at 45° to one another. The cylindrical part then comprises six sets of radial channels 32 each comprising eight radial channels at 45° to one another.

The cylindrical part is coated with a draining intermediate layer 5, here formed of a glass fiber fabric, for example in the form of a sleeve or braid. The intermediate layer has a certain elasticity to follow the deformations of the cylindrical part when the roller is pressed against the application surface.

The intermediate layer is externally coated with an external anti-adherent sheath 6, formed here of a heat-shrunk PFA film on the surface of the cylindrical part, with the draining intermediate layer interposed between the cylindrical part and the sheath. The anti-adherent sheath through which the roller is in contact with the band, limits the adhesion of the roller to the s, as well as the fouling of the roller.

According to an embodiment of the invention, the anti-adherent sheath has lateral portions 61 extending beyond the cylindrical surface along the lateral faces 34 of the cylindrical part.

The anti-adherent sheath is formed from a tubular film of greater length than that of the cylindrical part, which is fitted onto the cylindrical part then thermoformed, so that the lateral portions are at least partially flattened along the lateral faces. The lateral portions thus heat-shrunk ensure the blocking in translation and in rotation of the anti-adherent sheath and of the intermediate layer on the cylindrical part.

The intermediate layer 5 also has lateral portions 51 extending beyond the cylindrical surface and which are inserted between the lateral faces 34 and the heat-shrunk lateral portions 61 of the sheath.

The mounting of the roller on the head is carried out by means of an axial rod 21 mounted in the internal passage of the central tube 4 by means of two ball bearings 24, the central tube advantageously having a counterbore at each end for the mounting of a bearing. The roller is then mounted by the ends of the axial rod between two flanges 12 of the support structure of the head.

The machine comprises thermal regulation means (not shown), making it possible to inject a gas at room temperature, between 15 and 30° C., or a gas cooled to a temperature below 15° C., in particular air, through one end of the axial rod. The axial rod 21 has an axial passage 22 opening onto one 25 of the ends of the rod, and a radial bore 23 enabling said axial passage 22 and the internal passage 42 of the central tube to be placed in fluid communication, between the two bearings, the two bearings being sealed bearings.

In operation, the air injected through at least the open end of the axial rod, arrives in the internal passage 42 between the two sealed bearings, passes through the radial holes 41 then the radial channels 32 of the cylindrical part, then passes through the draining intermediate layer 5 and escapes laterally through the lateral portions 51. This injected air makes it possible to uniformly cool, the cylindrical part of flexible material, as well as the sheath.

The laser type heating system can comprise laser diodes, arranged in one or more rows, emitting radiation of a wavelength(s) between 880 to 1030 nm for example, a fiber optic laser or a YAG laser, emitting a wavelength of around 1060 nm.

The air knife from the blowing system 8 blows out the resin combustion flames, more precisely extinguishes by blowing out the flames that may appear during laser heating, or even eliminates the emergence of any flames by blowing them out. Thus, the air knife makes it possible to limit or even to eliminate any pollution of the sheath linked to combustion.

For example, the head is equipped with a compacting roller having a length of approximately 6 cm, intended to layup a band of 8 fibers of 6.35 mm (¼" inch). The nozzle comprises a row of charging outlets forming a knife of approximately 5 cm at the nozzle exit. The nozzle is supplied with compressed air at 5 bars, equivalent to an air knife at a flow rate of approximately 700 Nl/m.

Figure 4:
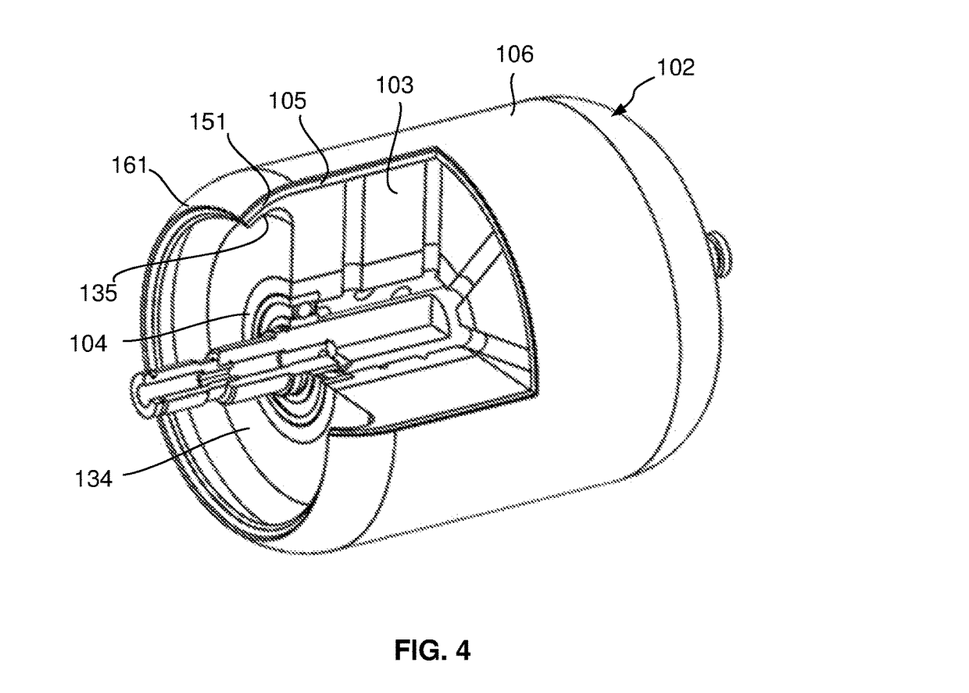
FIG. 4 is a perspective view of a compacting roller with a partial cut away, according to a second embodiment.

FIG. 4 illustrates a second embodiment of the invention in which the compacting roller 102 comprises as previously a rigid central tube 104 provided with radial holes, a cylindrical part 103 made of elastically deformable flexible material provided with radial channels, an intermediate layer 105 with lateral portions 151, and an anti-adherent sheath 106 thermoformed with lateral portions 161.

In this embodiment, the cylindrical part comprises a central cylindrical part extending laterally via two annular flanges 134 whose outer surfaces form a continuous surface with the cylindrical surface 133. The cylindrical portion and the lateral flanges are molded into one piece, the flanges having a cylindrical outer surface. The lateral portions 151, 161 of the intermediate layer and of the sheath are arranged on said flanges 135. During the thermoforming of the sheath, the flanges progressively fold inwards in the direction of the lateral faces of the cylindrical part, such as illustrated in FIG. 4. The flanges allow the sheath and the intermediate layer to be folded over a non-sharp edge at the end of the cylindrical part, and thus to avoid deterioration of the sheath over time at the level of the folding.

Figure 5:
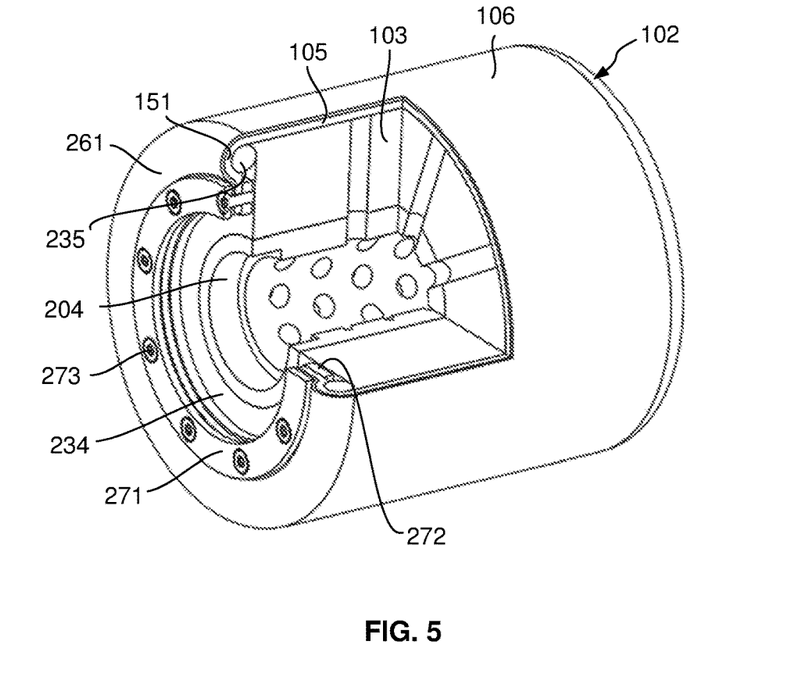
FIG. 5 is a perspective view of a compacting roller according to a third embodiment.

FIG. 5 illustrates a third embodiment of the invention in which the compacting roller 202 comprises as previously a rigid central tube 204 provided with radial holes, a cylindrical part 103 of elastically deformable flexible material provided with radial channels, an intermediate layer 205 with lateral portions 251, and an anti-adherent sheath 206 thermoformed with lateral portions 261.

In this embodiment, as a replacement for the aforementioned flanges, the roller comprises a O-ring seal or part 235 arranged against each lateral face 234 of the cylindrical part, and the anti-adherent sheath 206 is heat-shrunk over said seals. The seals have an outside diameter equal to the outside diameter of the cylindrical part and enable the sheath and the intermediate layer to be folded over a non-sharp angle at the end of the cylindrical part. Preferably, the cylindrical part has a small flange at the end to ensure perfect surface continuity between the cylindrical surface of the cylindrical part and the seal.

Furthermore, the assembly by heat-shrinking is here completed by mechanical assembly by means of two washers 271, 272 assembled together by means of screws 273 by enclosing the annular end sections of the lateral portions 251, 261 of the sheath and of the intermediate layer between them.

The washers are pressed one against the another by contact zones angularly spaced to one another, to enable the evacuation of the air flow by the lateral portions of the intermediate layer between two contact zones. For this purpose, at least one or both of the washers are ringed, or one or both of the washers have, on their opposing faces, bosses or studs distributed at regular angular intervals, for example at the holes of the outer washer and/or the threads of the inner washer which serve for screwing in the screws, the washers being pressed one against the other by said bosses when tightening the screws.

Figure 6:
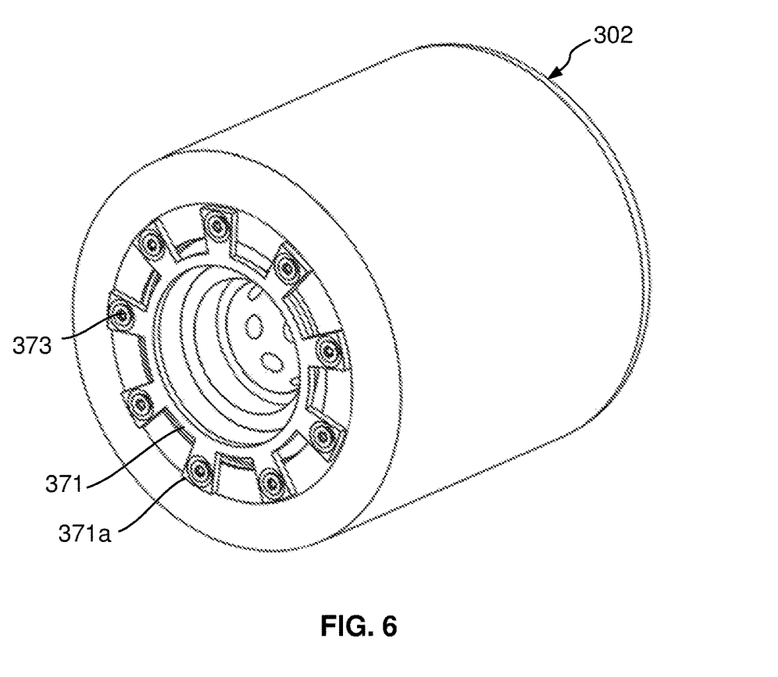
FIG. 6 is a perspective view of a compacting roller, with a partial cut away, according to a fourth embodiment.

FIG. 6 illustrates a fourth embodiment of a compacting roller 302 which differs from the preceding compacting roller 202 in that the two annular washers 371 have tabs 371*a* arranged at regular angular intervals and extend radially towards the exterior, the two washers are assembled to each other by means of screws 373 screwed into the tabs, enclosing between them the end portions of the anti-adherent sheath and of the intermediate layer. Thus, in this embodiment, the air injected from inside the tube escapes through each zone of lateral portions of the intermediate layer arranged between two adjacent tabs.

Figure 7:
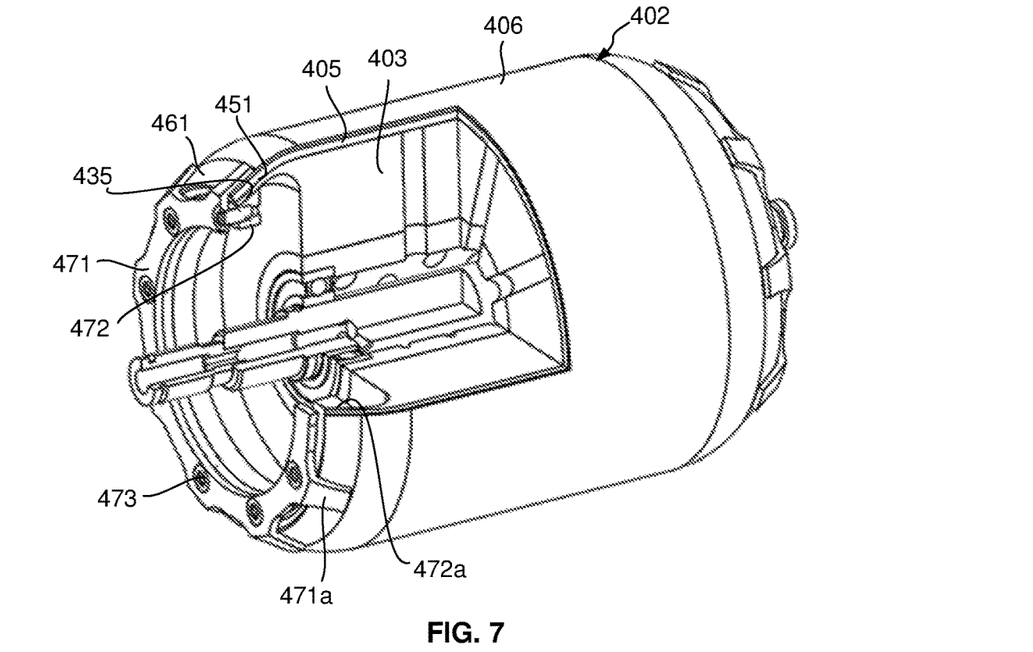
FIG. 7 is a perspective view of a compacting roller, with a partial cut away, according to a fifth embodiment; and, FIG. 8 is a perspective view of a compacting roller, with a partial cut away, according to a sixth embodiment.

FIG. 7 illustrates a fifth embodiment of a compacting roller 402 which differs from the compacting roller 102 illustrated in FIG. 4 by the fact that, on each side of the roller, the annular flange 435, the lateral portion 451 of the intermediate layer 405, as well as the lateral portion 461 of the sheath 406 are assembled together by mechanical means. These mechanical means comprise an outer washer or crown 471 provided with inclined tabs 471*a* at regular angular intervals, and a washer or inner ring 472 provided with an inclined annular surface 472*a*, the crown and the ring being assembled to each another by screws 473, so that the flange and the two lateral portions 451, 461 are enclosed between the inclined tabs and said inclined surface of the ring.

Figure 8:
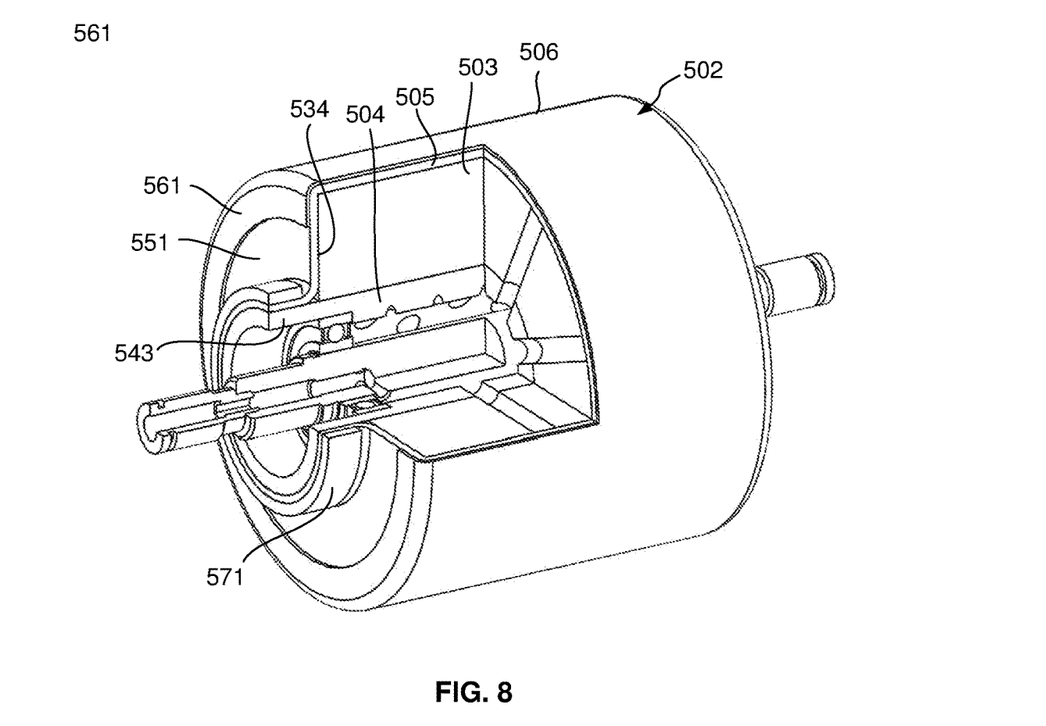

FIG. 8 illustrates a sixth embodiment which differs from the embodiment of FIG. 3 by the fact that, on each side of the roller 502, the central tube 504 has an end section 543 extending beyond the lateral face 533 of the cylindrical part 503, the lateral portion 551 of the intermediate layer 505 extends beyond the lateral portion 461 of the thermoformed anti-adherent sheath 506, over the whole of the lateral face of the cylindrical part 533, and is blocked on the end section 543 of the tube by means of a ring 571. For example, the ring is crimped or screwed onto the tube, or is formed of two half-rings assembled by screwing. In this embodiment, the sheath is held in place only by thermoforming, only the intermediate layer is assembled by mechanical means.

Although the invention has been described in connection with various particular embodiments, it will be understood that it is not limited thereto and that it includes all the technical equivalents of the means described as well as their combinations if they are within the scope of the invention.

The invention claimed is:
1. A fiber application head for producing composite material parts, comprising
    a compacting system comprising a compacting roller, for the application of one or more fibers, onto an application surface, said compacting roller comprising a rigid central tube and at least one cylindrical part made of a flexible material, elastically deformable, assembled on said central tube, and an anti-adherent sheath covering the cylindrical part, and a heating system capable of emitting thermal radiation in the direction of the fiber or fibers, wherein said anti-adherent sheath has lateral portions extending beyond a cylindrical surface of the cylindrical part in the direction of the rotation axis of the roller, the assembly of said anti-adherent sheath to said cylindrical part being carried out by said lateral portions.

2. A head according to claim 1, wherein said anti-adherent sheath is thermoformed onto the cylindrical part, the thermoformed lateral portions ensuring at least partially the blocking of the sheath in rotation and in translation.

3. A head according to claim 1, wherein
said central tube is provided with radial holes, said cylindrical part of flexible material having radial channels capable of putting said radial holes in fluid communication with the cylindrical surface of the cylindrical part, said head comprising an injector capable of injecting a thermal regulation gas flow, into an internal passage of the central tube,
said roller comprises a draining intermediate layer interposed between the anti-adherent sheath and the cylindrical part, said intermediate layer ensuring the evacuation of a thermal regulation fluid through lateral faces of the roller.

4. A head according to claim 3, wherein said intermediate layer comprises glass.

5. A head according to claim 3, wherein the intermediate layer has end portions extending beyond the cylindrical surface of the cylindrical part.

6. A head according to claim 1, wherein each lateral portion of the sheath is assembled by its annular end section to two washers.

7. A head according to claim 5, wherein each lateral portion of the intermediate layer is assembled by its annular end section to two washers.

8. A head according to claim 6, wherein the two washers are assembled to one another and between which the annular end section of the sheath and/or of the intermediate layer is enclosed.

9. A head according to claim 1, wherein the roller has at each end a portion defining a curved or inclined surface arranged in the extension of the cylindrical surface.

10. A head according to claim 1, wherein the head comprises a laser type heating system capable of emitting a laser beam in the direction of a contact zone between the roller and a layup surface.

11. A method for manufacturing a composite material part comprising the application of continuous fibers onto an application surface, wherein the application of fibers is carried out by a fiber application head according to claim 1, by relative movement of the application head in relation to a layup surface along layup trajectories.

* * * * *